United States Patent [19]
Sakamoto

[11] Patent Number: 5,990,863
[45] Date of Patent: Nov. 23, 1999

[54] IMAGE DISPLAY SYSTEM

[75] Inventor: Susumu Sakamoto, Tokyo, Japan

[73] Assignee: NEC Corporation, Tokyo, Japan

[21] Appl. No.: 08/823,903

[22] Filed: Mar. 25, 1997

Related U.S. Application Data

[30] Foreign Application Priority Data

Mar. 25, 1996 [JP] Japan ................................. 8-067902

[51] Int. Cl.$^6$ ...................................................... H04N 7/01

[52] U.S. Cl. ........................... 345/147; 348/448; 348/452

[58] Field of Search ........................... 348/448, 449–452, 348/458, 687, 625, 473; 345/138, 147

[56] References Cited

U.S. PATENT DOCUMENTS

| | | | |
|---|---|---|---|
| 4,698,674 | 10/1987 | Bloom | 358/140 |
| 5,068,648 | 11/1991 | Chiba | 340/750 |
| 5,473,382 | 12/1995 | Nohmi | 348/448 |
| 5,790,096 | 7/1998 | Hill | 345/150 |

*Primary Examiner*—Mark R. Powell
*Assistant Examiner*—Mansour M. Said
*Attorney, Agent, or Firm*—Foley & Lardner

[57] ABSTRACT

An image display system is provided with a difference calculator for calculating, when interlacing video signals are entered, differences between fields from the input interlacing video signals and non-interlacing video signals, into which the interlacing signals are converted when they are read out of a frame buffer, and a brightness controller for controlling the brightness of video signals in the after image field on the basis of the differences calculated by the difference calculator.

3 Claims, 4 Drawing Sheets

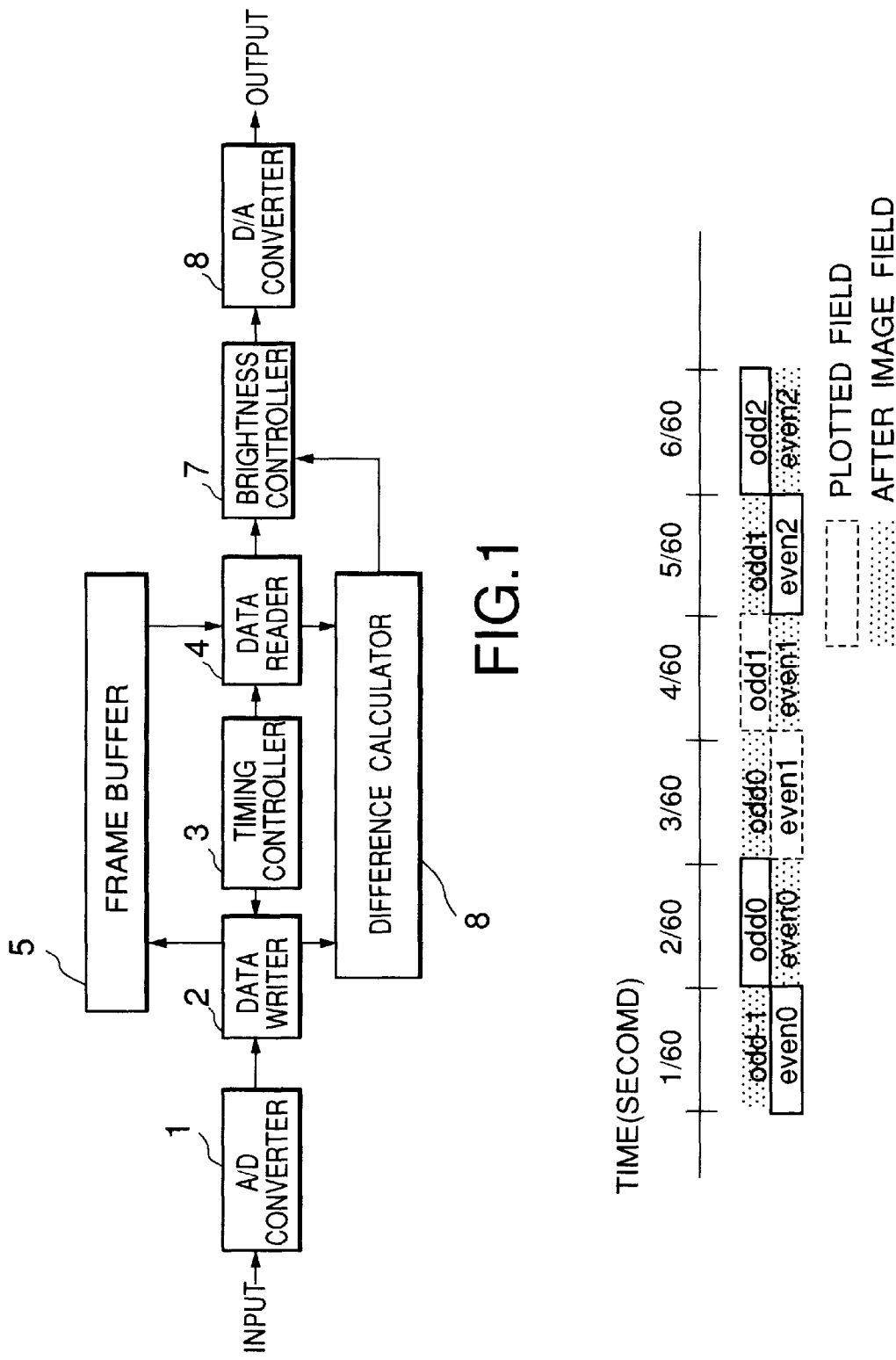

IMAGE DISPLAY SYSTEM

BACKGROUND OF THE INVENTION

The present invention relates to an image display system for displaying interlaced images (of television and laser disc signals) on non-interlace display apparatuses, such as those used in personal computers (PC).

According to the prior art, video signals from television or laser discs are sometimes inputted to a PC and displayed on its screen, and these input signals constitute what are called interlaced images in which even-number fields and odd-number fields are alternated every 1/60 second. These signals comprising even-number and odd-number fields are together referred to as frames. An example of such display apparatus according to the prior art is disclosed in the U.S. Pat. No. 5,068,648.

When interlacing signals are to be used for displaying non-interlaced images on a PC screen, conversion from inter lace to non-interlace is required.

According to the prior art, interlacing signals from the input source are once stored in a memory known as a frame buffer, end when they are read out of the frame buffer, they are converted into non-interlacing signals to display non-interlaced images on the PC screen.

FIG. 6 illustrates conventional methods of interlace-to-non-interlace conversion: (a) shows a single buffer system, (b), a double buffer plus frame display system, and (c), another double buffer plus frame display system.

In the single buffer system shown in FIG. 6(*a*), the same buffer is used as read buffer for display indication and as write buffer for the input source.

In the double buffer plus frame display system shown in FIG. 6(*b*) (hereinafter called Double Buffer System 1), the read buffer for display indication and the write buffer for the input source arm separate, and the fields are displayed at a rate of 30 frames per second (fps).

In the double buffer plus frame display system shown in FIG. 6(*b*) (hereinafter called Double Buffer System 2), the read buffer for display indication and the write buffer for the input source are separate, and each even- or odd-number field is displayed at a rate of 60 fps. In display indication, each field is extended vertically, and interpolation lines are inserted into the spaces between fields.

The methods described above involve the following problems.

(1) Single Buffer System

An both fields of input interlaced images are displayed as single images, resolution in the vertical direction is high, resulting in clear displaying of still or slow-moving images, but fast-moving images are subject to motion artifacts on the contours of moving objects corresponding to time differences between fields (1/60 second), resulting in blurred contours.

As the speed of writing from the input source is constant in this systems while computers or the like use faster display apparatuses, reading from the frame buffer may over-take writing from the image input source to the frame buffer and, if it does, an image under updating is displayed.

(2) Double Buffer System 1

Since an update buffer and a display buffer are separately provided, there is no possibility for an image under updating to be displayed. However, as the even-number and odd-number fields of each input interlaced image are displayed as a single frame, fast-moving images are subject to motion artifacts on the contours of moving objects corresponding to time differences between fields, resulting in blurred contours.

(3) Double Buffer System 2

Since each even-number or odd-number field of the input interlaced image is displayed as a single frame, even fast-moving images are immune from motion artifacts due to differences in motion corresponding to time differences between fields, but the height of the frame is doubled when displayed and interpolating lines are inserted between the original lines, resulting in poor resolution in the vertical direction and consequent deterioration in picture quality.

Moreover, as most such methods do not take into consideration the correlation between one field and the next in inserting an interpolating line as mentioned above, the displayed image, especially where a striped pattern is involved, may turn out completely different from the original image.

The present invention, worked out in view of the above-described problems involved in the prior art, is intended to provide an image display system subject to no conspicuous motion artifact ensuing from differences in motion corresponding to time differences between fields.

SUMMARY OF THE INVENTION

In order to achieve the aforementioned object, according to the invention, there is provided an image display system for displaying interlacing video signals in the form of non-interlacing video signals, comprising:

a frame buffer for temporarily storing input interlacing video signals, a difference calculator for calculating differences between fields from said interlacing video signals, and a brightness controller for controlling, on the basis of the differences between fields calculated by said difference calculator, the brightness of video signals stored in said frame buffer.

At image display system according to the invention may further have:

a data writer for reading input interlacing video signals into said frame buffer and delivering them to said difference calculator;

a data reader for converting interlacing video signals stored in said frame buffer into non-interlacing video signals, reading them and delivering them to said difference calculator; and a timing controller for controlling the timing of writing video signals into said frame buffer by said data writer and that of reading video signals out of said frame buffer by said data reader, wherein said difference calculator calculates differences between fields from interlacing video signals delivered from said data writer and non-interlacing video signals read out of said frame buffer.

The difference calculator comprises a selector for judging in said data reader whether video date read out of said frame buffer are data in a plotted field or data in an after image field;

a plotted field buffer for processing video data when said selector judges them to be data in a plotted field;

an after image field buffer for delivering video data to said brightness controller when said selector judges them to be data in an after image field; and an inter-field difference calculator for calculating differences between video signals delivered from said data writer and video signals delivered to said plotted field buffer.

BRIEF DESCRIPTION OF THE DRAWINGS

FIG. 1 is a block diagram of an image display system which is a preferred embodiment of the present invention;

FIG. 2 is a diagram illustrating the usual timing of video outputs;

DETAILED DESCRIPTION OF THE PREFERRED EMBODIMENT OF THE INVENTION

Figure 3:
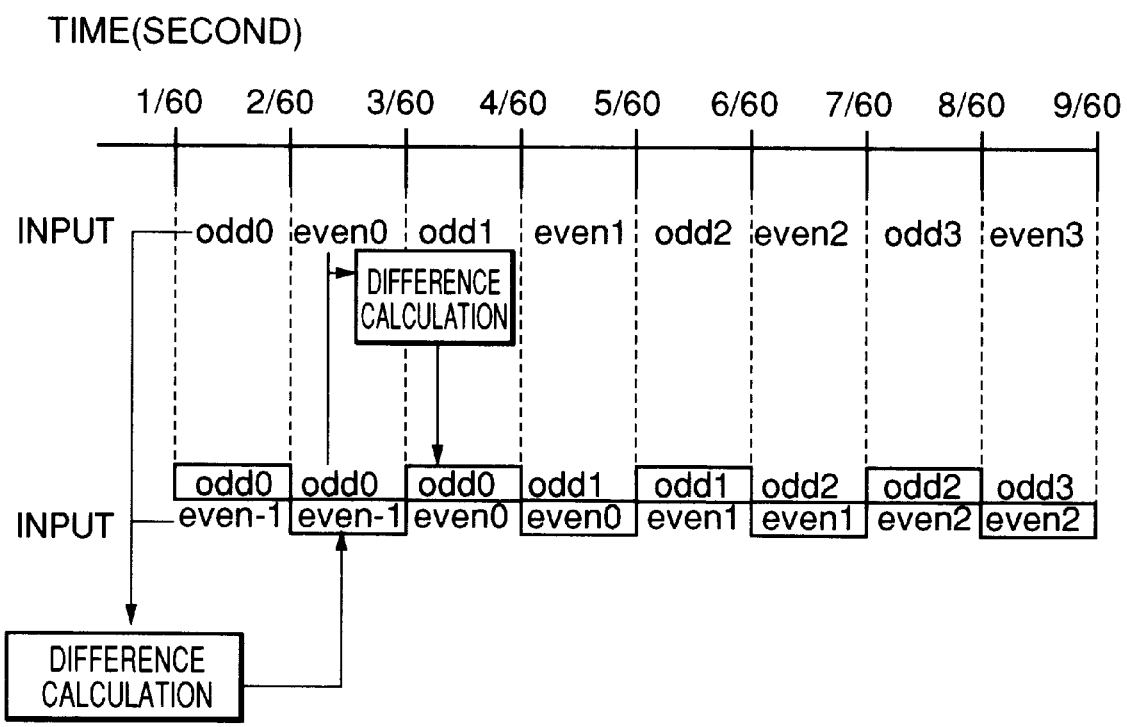
FIG. 3 is a diagram illustrating the timing of difference calculation in the image display system shown in FIG. 1.

A preferred embodiment of the present invention will be described in detail below with reference to drawings.

FIG. 1 is a block diagram of an image display system which is the preferred embodiment of the present invention.

This embodiment includes, as illustrated in FIG. 1, an analog-to-digital (A/D) converter 1 for converting input interlacing video signals into digital signals; a frame buffer 5 for temporarily storing the digital signals resulting from the conversion of interlacing video signals by the A/D converter 1; a difference calculator 6 for calculating inter-field differences from the digital signals resulting from the conversion of video signals by the A/D converter 1; a data writer 2 for writing into the frame buffer 5 the digital signals resulting from the conversion of video signals by the A/D converter 1 and delivering them to the difference calculator 6; a data reader 4 for converting the interlacing video signals into non-interlacing video signals by altering the frequency, reading them out, and delivering them to the difference calculator 6; a timing controller 3 for controlling the timing of writing video signals into the frame buffer 5 by the data writer 2 and that of reading video signals out of the frame buffer 5 by the data reader 41 a brightness controller 7 for controlling, on the basis of the inter-field differences calculated by the difference calculator 6, the brightness of video signals read out of the frame buffer 5 in the data reader 4; and a digital-to-analog (D/A) converter 8 for converting the video signals, whose brightness is controlled by the brightness controller 7, into analog, signals.

In the image display system having the above-described configuration, input interlacing video signals are first stored into the frame buffer 5, and converted into non-interlacing video signals by altering their frequency when they are read out. Inter-field differences are calculated from the input video signals by the difference calculator 6 and, on the basis of the calculation results, the brightness controller 7 controls the brightness of video signals, which are then outputted.

FIG. 2 is a diagram illustrating the usual timing of video outputs, wherein "odd" represents an odd-number field, "even", an even-number field, and the numeral following "odd" or "even", a position in the time sequence.

The output image is divided into a plotted field and an after image field, which are currently being plotted and remaining as an after image, respectively.

FIG. 3 is a diagram illustrating the timing of difference calculation in the image display system shown in FIG. 1.

The input is the timing of the entry of video signals into the frame buffer 5, and the output is that of the reading of video signals from the frame buffer 5.

As video signals entered here are once stored into the frame buffer 5 to be altered in frequency, their display is delayed by 1/60 second. The parts of the image to be out-putted in the after image fields are controlled in brightness on the basis of the inter-field differences calculated by the difference calculator 6 before they are outputted.

In calculating an inter-field difference, the field currently displayed in a plotting state is compared with the incoming image to figure out the difference. The calculation is completed at the end of the input field, and then controlled so as to be reflected in the field of an after image state.

Figure 4:
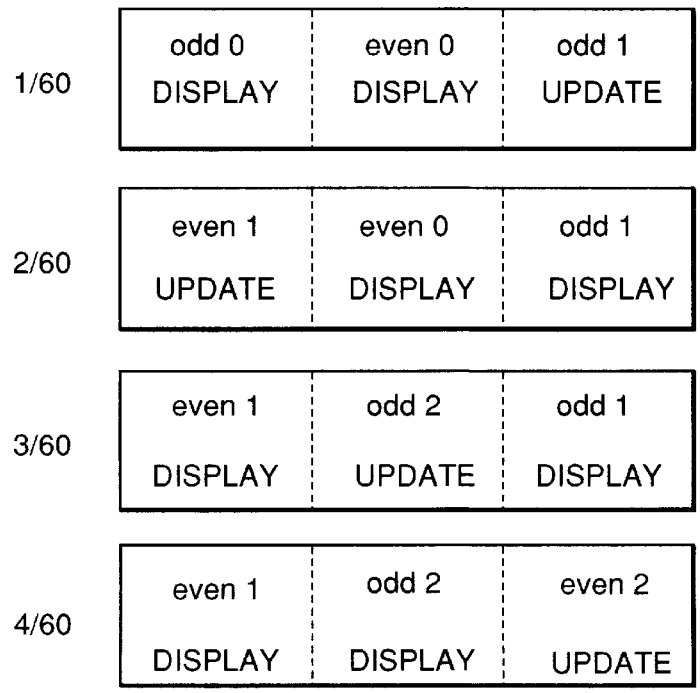
FIG. 4 is a diagram for describing an example of updating of the frame buffer in the image display system shown in FIG. 1.

FIG. 4 is a diagram for describing an example of updating of the frame buffer in the image display system shown in FIG. 1.

As shown in FIG. 4, this embodiment is provided with a buffer for updating fields in addition to buffers for displaying odd-number and ever-number fields.

First, when "odd1" is entered, "odd0" and "even0" are displayed. In this case, "odd0" is displayed with its brightness con-rolled, and the difference between "even0" and "odd1" is calculated.

Next, when the state is switched to display "even0" and "odd1", the buffer area in which "odd0" was previously displayed becomes an updating buffer, and "even1" is entered. In this case, "even0" is displayed with its brightness controlled, and the difference between "odd1" and "even1" is calculated.

Then, when the state is switched to display "odd1" and "even1", the buffer area in which "even0" was previously displayed becomes an updating buffer, and "odd2" is entered. In this case, "odd1" is displayed with its brightness controlled, and the difference between "even1" and "odd2" is calculated.

Next, when the state is switched to display "even1" and "odd2", the buffer area in which "odd1" was previously displayed becomes an updating buffer, and "even2" is entered. In this case, "even1" is displayed with its brightness controlled and the difference between "odd2" and "even2" is calculated.

In this manner, images in consecutive fields are entered successively into two display buffers and one updating buffer to be updated or displayed.

Figure 5:
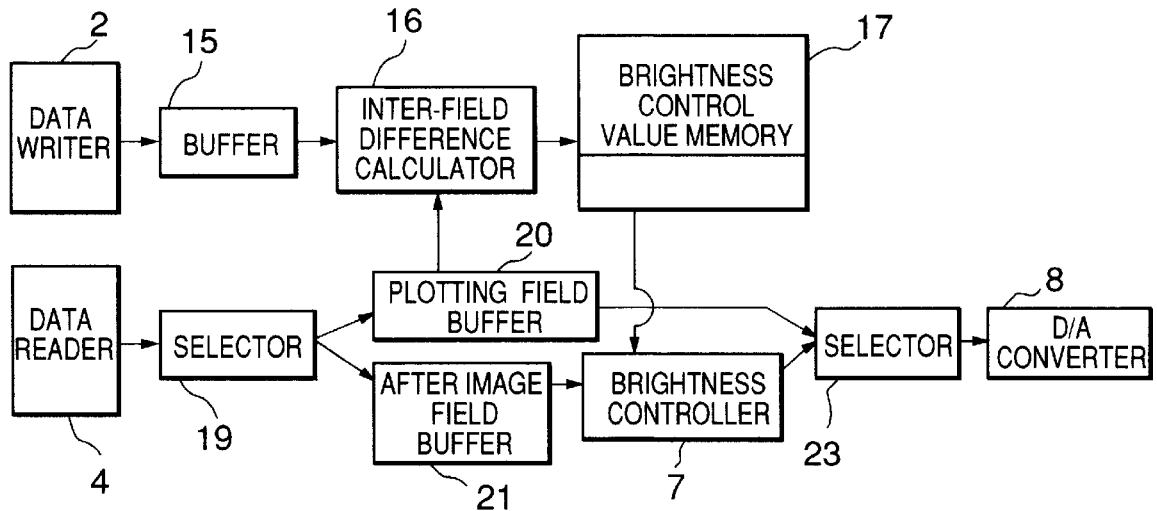
FIG. 5 is a block diagram for describing inter-field difference calculation and brightness control in the image display system shown in FIG. 1.
Figure 6A:
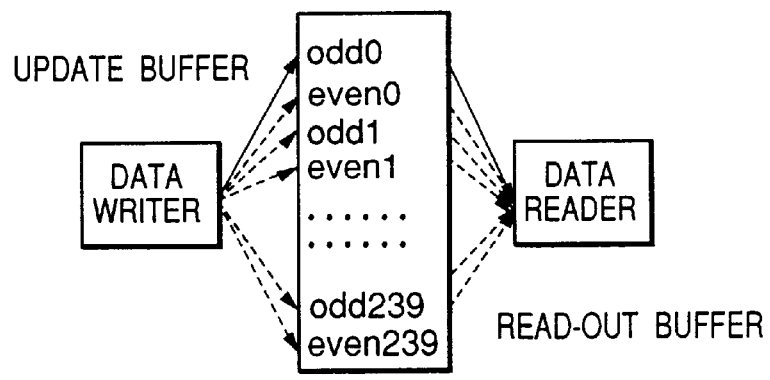
FIG. 6 is a diagram illustrating a conventional method of interlace-to-non-interlace conversion.
Figure 6B:
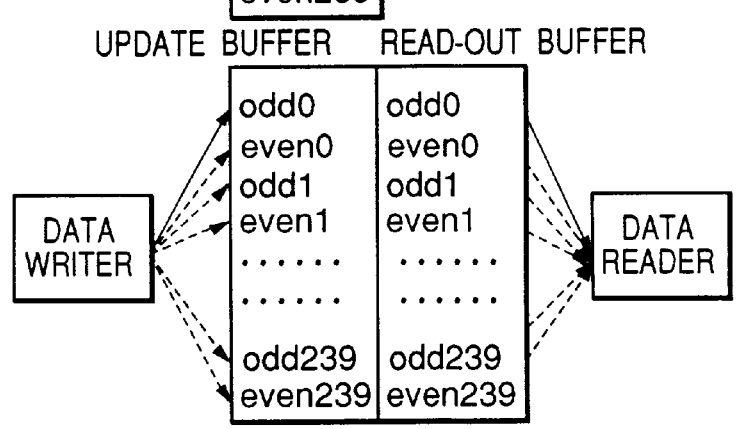
Figure 6C:
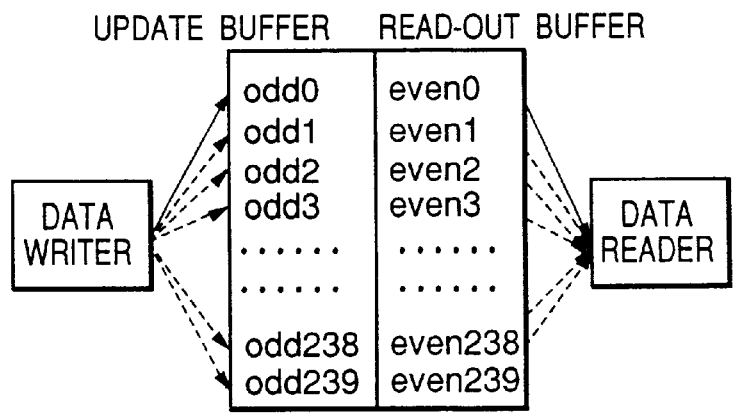

FIG. 5 is a block diagram for describing inter-field difference calculation and brightness control in the image display system shown in FIG. 1.

The difference calculator in this embodiment, as illustrated in FIG. 5, includes of a buffer 15 for controlling the frequencies of input images and output images; an interfield difference calculator 16 for calculating the difference between an image inputted to the frame buffer 5 and an image outputted from the frame buffer 5; a selector 19 for judging whether video data read by the data reader 4 out of the frame buffer 5 are data in a plotting field or data in an after image field; a plotting field buffer 20 for delivering, when the selector 19 judges given data to be data in a plotting field, the video data to the inter-field difference calculator 161 an after image field buffer 21 for delivering, when the selector 19 judges given data to be data in an after image field, the video data to the brightness controller 7; and a brightness control value memory 17 for storing the value calculated by the inter-field difference calculator 16.

When video data are entered into the data writer 2 via the A/D converter 1, the data writer 2 writes the latest video data, which are the same as the video data written into the frame buffer 5, into the buffer 15.

In the buffer 15, the frequency difference between the input image and the output image is absorbed to carry out necessary frequency control for calculating difference.

Meanwhile, the data read by the data reader 4 out of the frame buffer 5 are entered into the selector 19 to be judged whether they are data in a plotting field or data in an after image field.

Then, if the data are judged by the selector 19 to be data in a plotting field, they are delivered to the plotting field buffer 20 and, after undergoing frequency adjustment with the input data, further delivered to the inter-field difference calculator 16.

The data delivered to the inter-field difference calculator 16 under-go calculation of their difference from the data entered from the data writer 2 via the buffer 15, and the image control value for use when the data currently in a plotting field have shifted to an after image field in calculated, and stored in the brightness control value memory 17 as value to be displayed next.

Or if the data are judged by the selector 19 to be data in an after image field, they are delivered to the after image field buffer 21 and, after undergoing frequency adjustment with the data in the plotting field, further delivered to the brightness controller 7.

The data delivered to the brightness controller 7 undergo calculation by the inter-field difference calculator 16 and brightness control on the basis of the value stored in the brightness control value memory 17.

After that, a selector provided in the brightness controller 7 synthesizes data in the after image field, whose brightness has been controlled, with data in the plotting field, which have been delivered to the plotting field buffer 20, and the resultant synthesized data are delivered to the D/A converter 8.

As hitherto described, according to the present invention, there are provided a difference calculator for calculating, when interlacing video signals are entered, interfield differences according to the input interlacing video signals and non-interlacing video signals, into which the interlacing signals are converted when they are read out of a frame buffer, and a brightness controller for controlling the brightness of video signals in the after image field on the basis of the differences calculated by the difference calculator. Accordingly, even though images are updated, images both in the plotting field and in, the after image field can be displayed without allowing any image under updating to be displayed.

This arrangement makes it possible, even where interlacing video signals are to be displayed in the form of non-interlacing video signals, to prevent motion artifacts, which result from lags in motion corresponding to time differences between fields, from becoming conspicuous in fast-moving images and to display still pictures and slow-moving images with high vertical resolution.

What is claimed is:

1. An image display system for displaying interlacing video signals in the form of non-interlacing video signals, comprising:

a frame buffer for temporarily storing input interlacing video signals, a difference calculator for calculating differences between fields from said interlacing video signals, and a brightness controller for controlling, on the basis of the differences between fields calculated by said difference calculator, the brightness of video signals read out of said frame buffer.

2. An image display system, as claimed in claim 1, further having:

a data writer for reading input interlacing video signals into said frame buffer and delivering them to said difference calculator;

a data reader for converting interlacing video signals stored in said frame buffer into non-interlacing video signals, reading them and delivering them to said difference calculator; and a timing controller for controlling the timing of writing video signals into said frame buffer by said data writer and that of reading video signals out of said frame buffer by said data reader, wherein said difference calculator calculates differences between fields from interlacing video signals delivered from said data writer and non-interlacing video signals read out of said frame buffer.

3. An image display system, as claimed in claim 2, wherein:

said difference calculator comprises a selector for judging in said data reader whether video data read out of said frame buffer are data in a plotted field or data in an after image field;

a plotted field buffer for processing video data when said selector judges them to be date in a plotted field;

an after image field buffer for delivering video data to said brightness controller when said selector judges them to be data in an after image field; and an inter-field difference calculator for calculating differences between video signals delivered from said data writer and video signals delivered to said plotted field buffer.

* * * * *